(12) United States Patent
Young et al.

(10) Patent No.: US 6,462,277 B1
(45) Date of Patent: Oct. 8, 2002

(54) COVER ASSEMBLY FOR AN IN-FLOOR FITTING

(75) Inventors: Joe A. Young, Reedsville, OH (US); Michael T. Cole, Parkersburg, WV (US)

(73) Assignee: Walker Systems, Inc., Williamstown, WV (US)

( * ) Notice: Subject to any disclaimer, the term of this patent is extended or adjusted under 35 U.S.C. 154(b) by 0 days.

(21) Appl. No.: 09/946,884

(22) Filed: Sep. 5, 2001

Related U.S. Application Data (60) Provisional application No. 60/262,169, filed on Jan. 16, 2001.

(51) Int. Cl.[7] .................................................. H02G 3/14
(52) U.S. Cl. ........................ 174/66; 174/67; 220/241; 220/242
(58) Field of Search ............... 174/66, 67; 220/241, 220/242; 439/139; D13/177

(56) References Cited

U.S. PATENT DOCUMENTS

| | | |
|---|---|---|
| 2,672,749 A | 3/1954 | Weismann |
| 3,646,244 A | 2/1972 | Cole |
| 3,666,134 A | 5/1972 | Rauch |
| 3,830,954 A * | 8/1974 | Caudill .................. 174/35 MS |
| 4,027,097 A * | 5/1977 | Gillemot .................. 174/66 |
| 4,058,358 A | 11/1977 | Carlisle |
| 4,109,095 A * | 8/1978 | Kling et al. ............... 174/67 |
| 4,197,959 A | 4/1980 | Kramer |
| 4,228,317 A | 10/1980 | Cziment |
| 4,289,921 A | 9/1981 | Gartner et al. |
| 4,342,493 A | 8/1982 | Grenell |
| 4,343,411 A | 8/1982 | Chesnut et al. |
| 4,458,460 A | 7/1984 | Kohaut |
| 4,541,538 A * | 9/1985 | Swetnam .................. 174/67 X |
| 4,640,564 A | 2/1987 | Hill |
| 4,711,634 A | 12/1987 | Antone, II et al. |

(List continued on next page.)

FOREIGN PATENT DOCUMENTS

JP 405304713 * 11/1993 .................. 174/66

Primary Examiner—Dean A. Reichard
Assistant Examiner—Dhiru R Patel
(74) Attorney, Agent, or Firm—McAndrews, Held & Malloy, Ltd.

(57) ABSTRACT

A cover assembly for an in-floor fitting of the type having an interior compartment which is accessible through an opening in the surface of the floor includes a bracket and a pair of access doors. The bracket is connectable to the fitting and defines an access opening which aligns with the floor opening. The access doors are pivotally connected to the mounting bracket for selectively exposing the access opening. When the doors are at their closed position, they define a cable opening between their free ends. The cable opening is sized to permit at least one cable to pass between the doors and into the interior compartment of the fitting. The access doors carry compressible seal members in their free ends which abut with one another when the doors are moved to their closed position so as to seal the cable opening around any cables passing therethrough. Egress covers are slidably connected to the access doors for selectively covering and exposing the cable opening.

14 Claims, 6 Drawing Sheets

U.S. PATENT DOCUMENTS

| | | |
|---|---|---|
| 4,733,017 A | 3/1988 | Wolfe-Taylor et al. |
| 4,770,643 A | 9/1988 | Castellani et al. |
| 4,774,384 A | 9/1988 | Gregory |
| 4,793,818 A | 12/1988 | Poirier |
| 4,810,833 A | 3/1989 | Meyers |
| 4,857,004 A | 8/1989 | Poirier |
| 4,874,906 A | 10/1989 | Shotey |
| 4,883,924 A | 11/1989 | Hadfield |
| 4,952,754 A | 8/1990 | Rye |
| 4,952,756 A | 8/1990 | Meyers |
| 5,017,153 A | 5/1991 | Bowman |
| 5,030,795 A | 7/1991 | Domigan |
| 5,032,690 A | 7/1991 | Bloom |
| 5,041,698 A * | 8/1991 | Takagi et al. .................. 174/66 |
| 5,107,075 A | 4/1992 | Currier, Jr. |
| 5,148,348 A | 9/1992 | White |
| 5,240,426 A | 8/1993 | Barla |
| 5,272,278 A | 12/1993 | Wuertz |
| 5,288,945 A | 2/1994 | Bruce |
| 5,306,178 A | 4/1994 | Huang |
| 5,563,373 A | 10/1996 | Doroslovac |
| 5,571,023 A | 11/1996 | Anthony |
| 5,588,853 A | 12/1996 | Anthony |
| 5,727,958 A * | 3/1998 | Chen ........................ 174/67 X |
| 5,743,752 A | 4/1998 | Massebeuf |
| 5,866,845 A | 2/1999 | Markiewicz et al. |
| 5,998,735 A | 12/1999 | Patterson, Jr. |
| 6,018,126 A | 1/2000 | Castellani et al. |
| 6,114,623 A | 9/2000 | Bonilla et al. |
| 6,132,227 A | 10/2000 | Boteler et al. |
| 6,175,078 B1 | 1/2001 | Bambardekar et al. |
| 6,179,634 B1 | 1/2001 | Hull et al. |
| 6,265,662 B1 * | 7/2001 | Riedy et al. .................. 174/67 |

* cited by examiner

COVER ASSEMBLY FOR AN IN-FLOOR FITTING

RELATED APPLICATIONS

This application claims priority of Provisional Application Serial No. 60/262,169 filed Jan. 16, 2001.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In-floor fittings such as poke-thru fittings, aftersets fittings and preset fittings are installed in concrete floors to provide electrical receptacles and communication/data receptacles (or jacks) at desired locations in buildings. As a result, such fittings may be exposed to water, e.g. during carpet cleaning. It is desirable that such fittings are designed to prevent moisture infiltration, particularly into the area of the fitting that contains the receptacles. In this respect, Underwriters Laboratories (UL) is proposing certification standards which will require such fittings to keep scrub water out of the portion of the fitting that houses the electrical outlet, e.g. the power portion. Scrub water is a soap and water mixture that is typically used when cleaning carpets. Previous infloor fittings do not provide a means for preventing the scrub water from entering the fitting.

BRIEF SUMMARY OF THE INVENTION

A cover assembly for use with an in-floor fitting of the type having an interior compartment which is accessible through an opening in the surface of the floor includes a bracket and at least one access door. The bracket is connectable to the fitting and defines an access opening that aligns with the floor opening and provides access to the interior compartment of the floor fitting. The access door is connected to the bracket for movement between a closed position at which the door overlies and closes the access opening and an open position at which the access opening is exposed to provide access to interior compartment. The access door includes a cable opening which is sized and configured to allow at least one cable to pass through the door and into the fitting when the door is in its closed position. A seal member is adapted to seal around cables passing through the cable opening when the access door is moved to its closed position.

The access cover may include a pair of access doors which are pivotally connected to the bracket. The access doors can be opened to provide access to the inner compartment through the access opening. When the doors are at their closed position, they define a cable opening therebetween. The cable opening is sized to permit at least one cable to pass between the doors and into the interior compartment. At least one of the doors includes a seal member which is adapted to compressibly seal around cables passing through the cable opening. Covers may be connected to the access doors for selectively exposing and covering the cable opening.

DETAILED DESCRIPTION OF THE INVENTION

Referring to the drawings, a cover assembly 10 is includes a bracket 12 and a pair of access doors 14a, 14b. The cover assembly 10 is configured for mounting over an in-floor fitting 16 to provide access thereto from above the floor. In the illustrated embodiment, the cover assembly 10 is show in connection with a preset fitting; however, it will be understood that the access cover could also be adapted for use with other types of fittings, such a afterset fittings, poke-thru fittings, or floor boxes.

Figure 1:
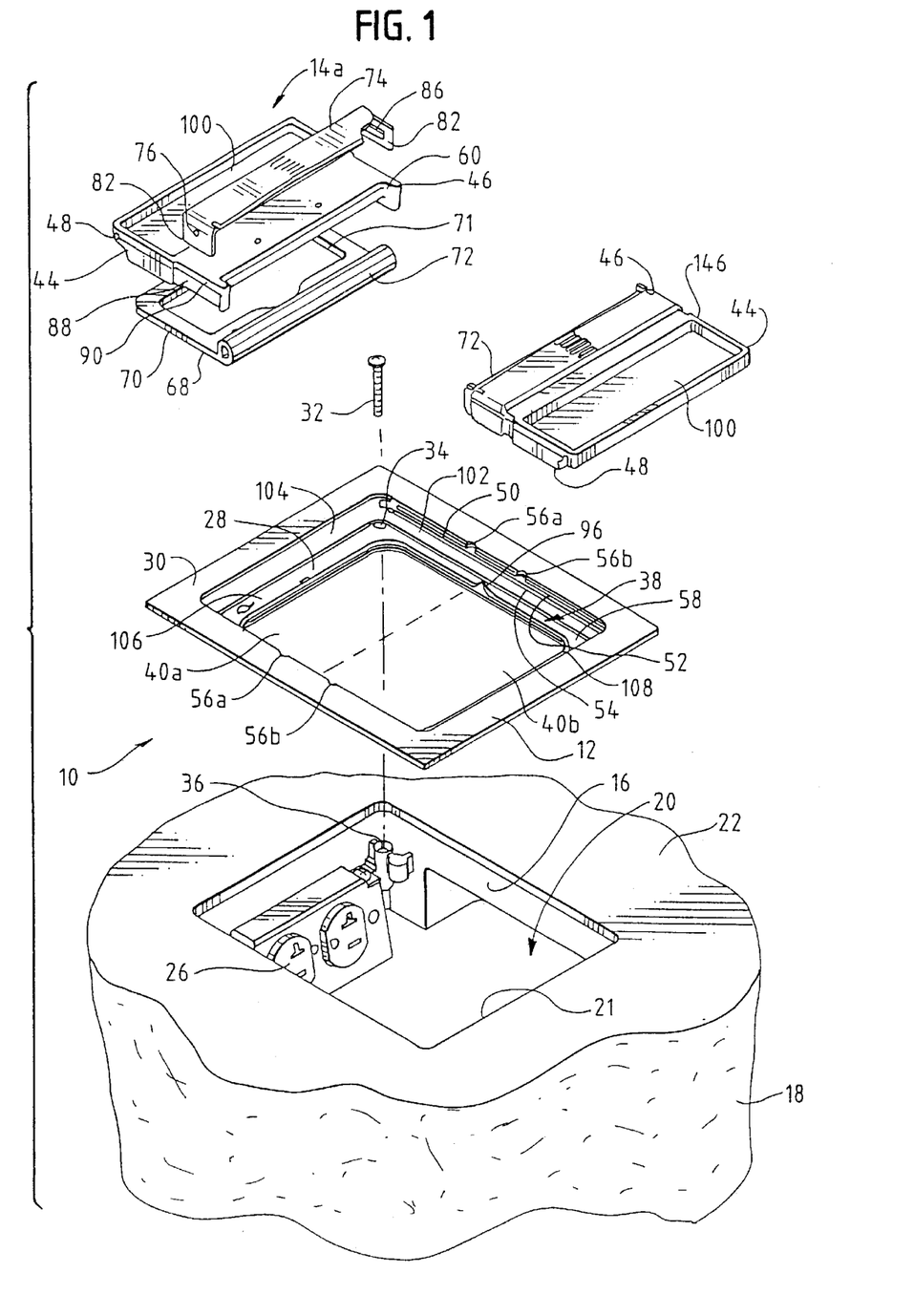
FIG. 1 is an exploded perspective view of a cover assembly according to certain aspects of the present invention.

By way of background, office buildings require electric power, communication, and computer data services in various combinations at a large number of locations. These needs are often addressed by in-floor cellular raceway systems which have a plurality of parallel cells for carrying service distribution cables including power cables, communication/data cables and the like. The cellular raceway is mounted on a sub-floor and covered with a concrete floor. Access to the under-floor cellular raceway is obtained through preset fittings that are mounted on the raceways at desired locations before the concrete floor is poured. As can be seen in FIG. 1, the preset fitting 16 defines a hollow interior compartment 20 that is interconnected with the raceway cells to provide access to the services cables that are carried in cells. A removable mud cap (not shown) on the top of the preset fitting 16 prevents concrete from entering the interior compartment when the floor 18 is poured. After the concrete floor has hardened, the concrete above the mud cap is broken away and the mud cap is removed to provide access to the interior 20 of the fitting 16 through an opening 21 in the surface 22 of the floor 18.

The in-floor fitting 16 is adapted to support receptacles 26, such as electrical receptacles and/or communication/data receptacles or jacks (not shown). Source cables (not shown) are routed into the fitting 16 from the raceway where they are interconnected with the receptacles. The receptacles present outlets (or connection terminals), which are accessible from above the floor 18 through the floor opening 20.

The cover assembly 10 is configured for mounting on the floor fitting 16 to close off the floor opening 20 and provide access to the fitting. For this purpose, the bracket 12 includes a central portion 28, which is sized for insertion into the floor opening 20. Although the floor opening and the bracket are illustrated as being generally rectangular, it will be appreciated that they could be circular, for example. The bracket 12 also includes an upper, outwardly extending flange or apron 30. The flange 30 overlies the floor surface 22 around the opening 21 to vertically support the bracket 12 within the fitting 16. The central portion 28 is generally rectangular and it protrudes downwardly from the flange 30. Fasteners 32 (one shown) extend through the apertures 34 in the corners of the bracket 12 and thread into reciprocal apertures 36 in the fitting 16 to secure the bracket to the fitting. A bead of sealant (not shown), such as silicon, may be applied around the perimeter of the underside of the flange 30 prior to installation of the bracket 12 to seal against water infiltration between the flange 30 and the floor surface 22. Alternatively, a compressible foam gasket (now shown) may be interposed between the flange 30 and the floor surface 22.

Figure 3:
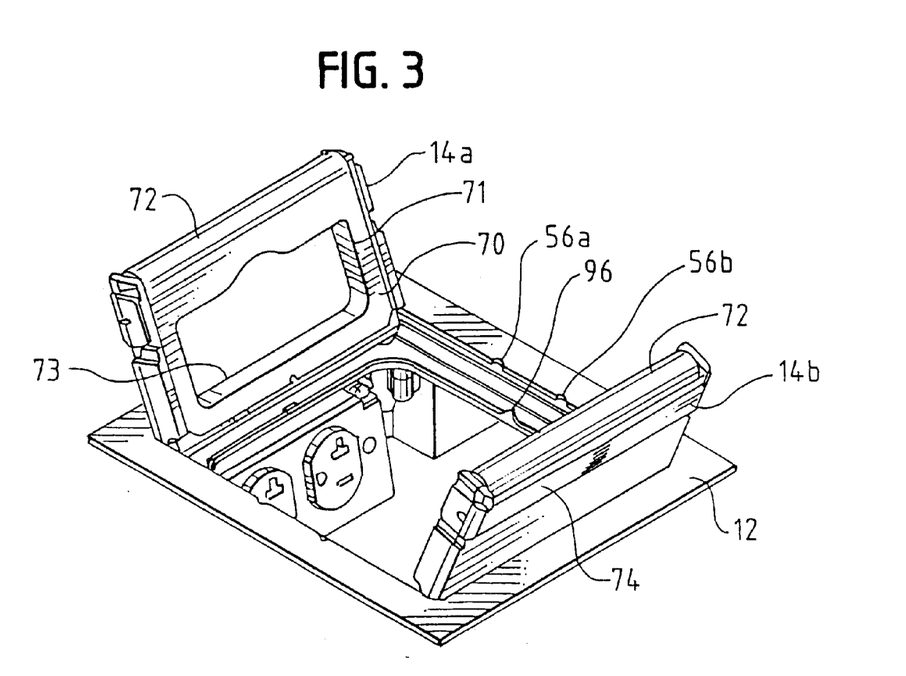
FIG. 3 is a perspective view of the cover assembly of FIG. 1, with both access doors at their open positions.
Figure 5:
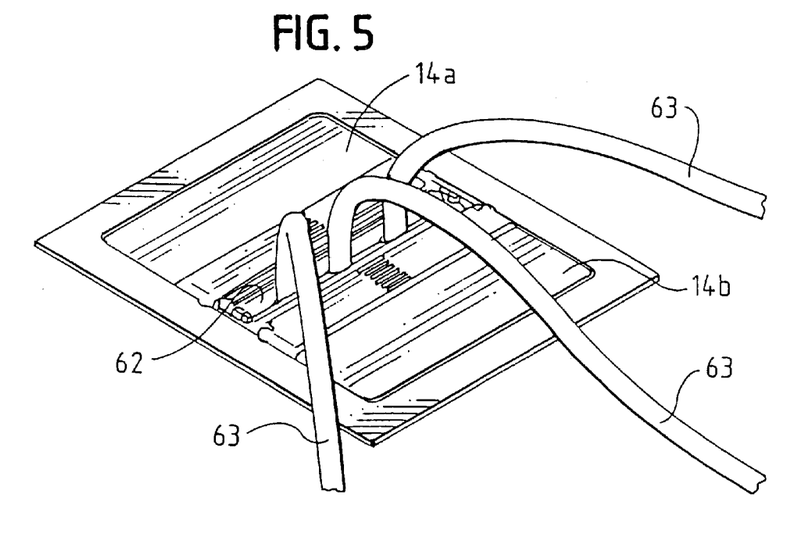
FIG. 5 is a perspective view of the cover assembly of FIG. 1, illustrating the access doors closed around a plurality of cables.

The bracket 12 is preferably constructed from a durable material such as cast aluminum, brass, or molded plastic. The bracket 12 includes a central access opening 38, which aligns with the floor opening 21 to provide access to the in-floor fitting 16. The access opening 38 is divided into a first portion 40a and a second portion 40b. A first access door 14a is associated with the first portion 40a of the opening 38 and is pivotally connected to the bracket 12 for movement between a first or closed position (see FIG. 5) and a second or open position (see FIG. 3). When the first access door 14a is at its closed position (see FIG. 5), it is generally flush and parallel with the floor surface 22. At this position, the first access door 14a overlies and blocks the first portion 40a of the opening 38. When the first access door 14a is at its second position (see FIG. 3), it is generally perpendicular to the floor surface 22 and the first portion 40a of the opening 38 is exposed to provide access to the interior compartment 20 of the fitting. Similarly, the second access door 14b is movable between a closed position (see FIG. 5) overlying the access opening second portion 40b and an open position (see FIG. 3) at which the access opening second portion 40b is exposed.

Each of the access doors 14a, 14b includes an outer, pivot end 44 and an inner, free end 46. The pivot end 44 carries a pair of outwardly extending pivot or hinge pins 48. The pins 48 extend from opposite sides of the door and are positioned and configured to engage in reciprocal horizontal slots 50 formed on opposite sides of the access opening 38 in the bracket 12. As can be seen in FIG. 1, the slots 50 run substantially the entire length of the access opening 38 and are defined by respective upper and lower walls 52, 54. While one pair of opposed slots 50 is shown in the illustrated embodiment, it will be appreciated that a separate pair of opposed slots could be provided for each of the doors 14a, 14b.

Figure 2:
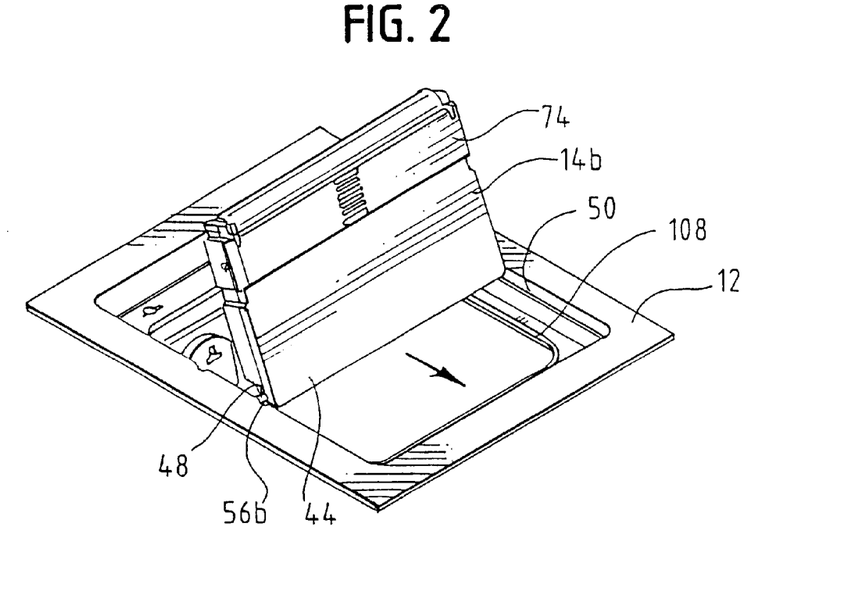
FIG. 2 is a perspective view of the cover assembly of FIG. 1, illustrating the manner in which the access doors are connected to the bracket.

Two pairs of opposed cut outs 56a, 56b are formed in the top wall 52 on the opposite sides of the access opening 38 to allow the doors 14a, 14b to be removed from and connected to the bracket 12. The manner in which the doors 14a, 14b are connected to the bracket can best be understood by referring to FIG. 2, which illustrates the second door 14b being installed into the flange. The access door 14b is connected to the trim bracket 12 by sliding its pivot pins 48 downwardly through the respective cut outs 56b and into the slots 50. Once the pins 48 are positioned in the slots 50, the pivot end 44 of the door 14b is slid outwardly until the pins seat in the outer ends of the slots 50. With the door 14b in this position, its free end 46 may be rotated between its open and closed positions. As will be appreciated, the first access door 14a is connected to the flange in the same manner.

Each of the doors 14a, 14b includes a cut-out portion 60 in its free end 46. When the doors are moved to their closed position, the cut-out portions 60 define a reduced-size cable opening 62 which serves as a cable egress between the doors 14a, 14b and into the fitting 16. The cable opening 62 is sized such that at least one cable 63, and preferably a plurality of cables, can be routed between the doors 14a, 14b and into the fitting 16.

Figure 4:
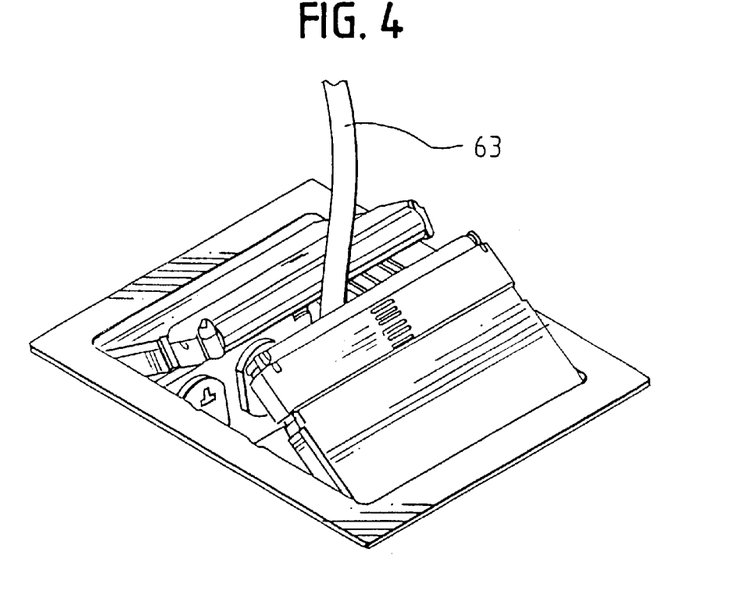
FIG. 4 is a perspective view of the cover assembly of FIG. 1, illustrating the access doors being closed around a cable which is routed into the floor fitting.

Seal members 68 carried by the doors 14a, 14b are adapted to seal the opening 62 when the doors are closed. Each seal member includes a body portion 70 which underlies the respective access door and a compressible portion 72 which is positioned in the cutout portion 60 of a respective door. The seal members 68 are connected to a respective door by adhesive, which may be in the form of an adhesive foam tape that is laminated on the back of the seal members to bond them to the doors. The seal member 68 is formed of an extruded foam gasket material and the compressible portion 72 may be formed by shaping the material into a bulb or tube, as is shown. The compressible portions 72 of the seal members 68 are configured to sealingly compress around the cables 63 as the doors are moved to their closed position. (See FIGS. 4 and 5) When no cables are present in the opening 62, the compressible portions 72 of the seal members 68 abut one another to seal the opening 62. (See FIG. 7). The body portion 70 of the seal members 68 may include a central opening 71. The central opening 71 aligns with a recess 73 on the bottom face of a respective access door 14a, 14b when the seal member 68 is installed on the door. The opening 71 and the recess 73 allow the door to be grasped more firmly with one's fingers during operation and installation.

Figure 6:
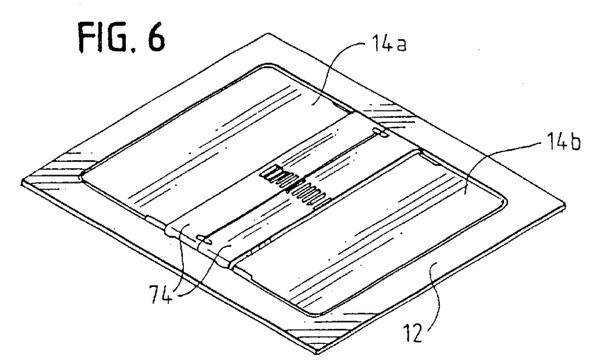
FIG. 6 is a perspective view of the cover assembly of FIG. 1, illustrating the egress covers in their closed positions.
Figure 7:
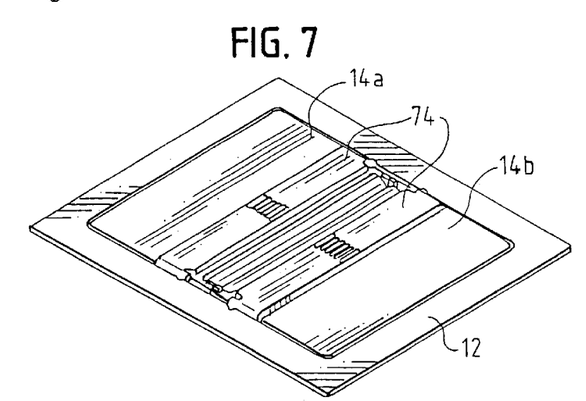
FIG. 7 is a perspective view of the cover assembly of FIG. 1, illustrating the egress covers in their open positions.
Figure 8:
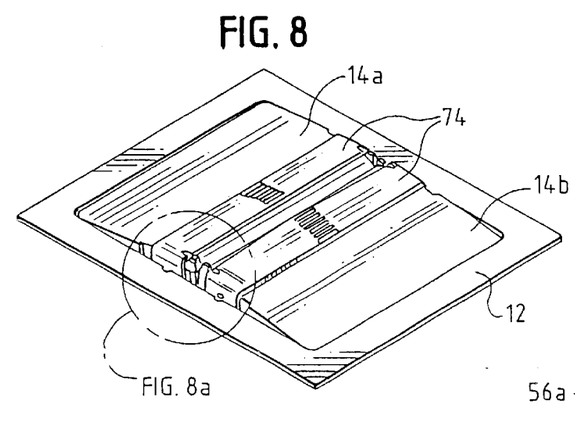
FIG. 8 is a perspective view of the cover assembly of FIG. 1, illustrating the egress covers in their neutral position.
Figure 8A:
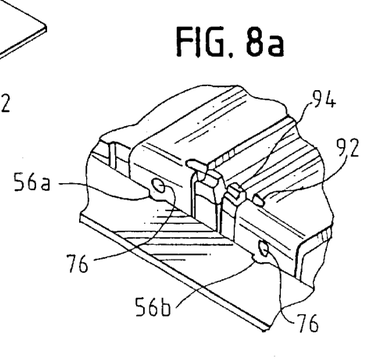
FIG. 8a is an enlarged view of a portion of FIG. 8.

Each of the access doors 14a, 14b further carries an egress cover 74 which is slidably connected to the door for movement between a closed or extended position (see FIG. 6), an intermediate or neutral position (see FIG. 8) and an open retracted position (see FIG. 7). When the egress cover 74 is at its closed position, it overlies the cut-out portion 60 of a respective access door. (See FIG. 6). When the egress cover 74 is at its open position, the cut-out portion 60 of the respective access door is exposed. (See FIG. FIGS. 5 and 7). When the egress door 74 is at its neutral position, opposed tabs 76 formed on its side walls 82 align with the respective cut-outs 56a, 56b in the top walls 52 to allow the access door 14a, 14b to rotate between its open and closed positions. (See FIG. 8). When an access door 14a, 14b is closed and its egress cover 74 is moved to either its open or closed position, the tabs 76 on the egress cover are captured within the slots 50, thereby retaining the access door in its closed position.

Referring to FIG. 1, each egress cover includes a top wall 80 and a pair of opposed, downwardly extending side walls 82. Tabs 86 extend inwardly from the side walls 84 and are configured to engage in reciprocal slots 88 formed on the side walls of the access doors 14a, 14b. The slots 88 and tabs 86 engage with each other to allow the egress cover to slidably move relative to the access door. The egress cover 74 is preferably made from plastic and is configured to snap into place on the access door 14. In particular, the egress cover 74 is connected to the access door 14 by sliding its side walls 82 downwardly over the access cover. As the cover 74 moves downwardly, the tabs 86 engage against the access door and bias the side walls 84 of the egress cover 74 outwardly. The egress cover 74 is moved downwardly until the tabs 86 extend below the top walls 90 of the slots 88, at which time they snap into place in the slots 88, thereby securing the egress cover 74 to the access door. Slots 92 in the top walls 80 of the egress covers 74 mate with upstanding tabs 94 formed on the doors 14a, 14b to limit travel of the egress covers 74 on the doors 14a, 14b in their closed direction.

The access doors 14a, 14b are constructed of a durable material such as cast aluminum, brass, or molded plastic. Preferably, the doors are made from the same material that is used to construct the bracket 12. As can be seen in FIG. 1, the doors 14a, 14b may include recessed portions 100 in their upper faces. Finish floor material, such as carpet or tile, may be installed in the recessed portions 100 to match the cover assembly 100 to the surrounding floor surface.

Upwardly extending protrusions 96 are formed on opposite sides of the central opening 38 at the junction of its first and second portions 40a, 40b. The protrusions 96 engage against the compressible portions 72 of the seal members 68 when the doors 14a, 14b are in their closed positions to bias the doors outwardly, e.g., towards the distal ends of the slots 50. As can be seen in FIG. 1, the protrusions 96 are gradually tapered such that they are narrower at their top end than at their bottom end.

Figure 9:
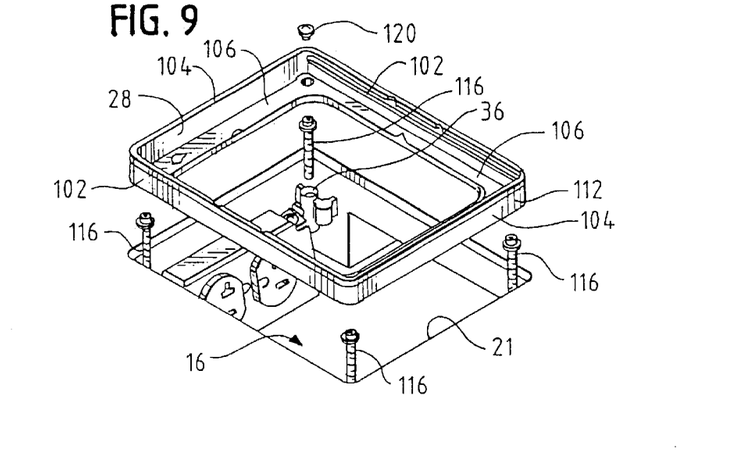
FIGS. 9 and 10 are perspective view illustrating an alternative bracket for use in the cover assembly.
Figure 9A:
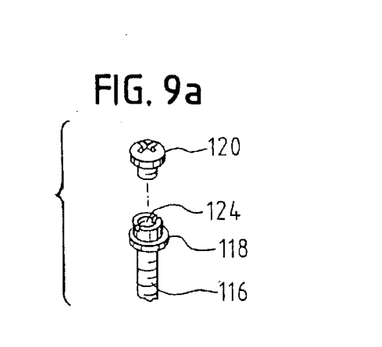
FIG. 9a is an enlarged view showing a hold down screw and a support screw from FIG. 9.
Figure 10:
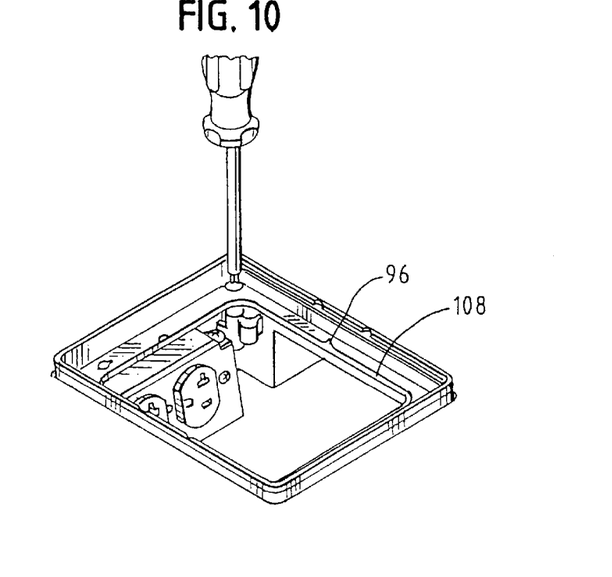
Figure 11:
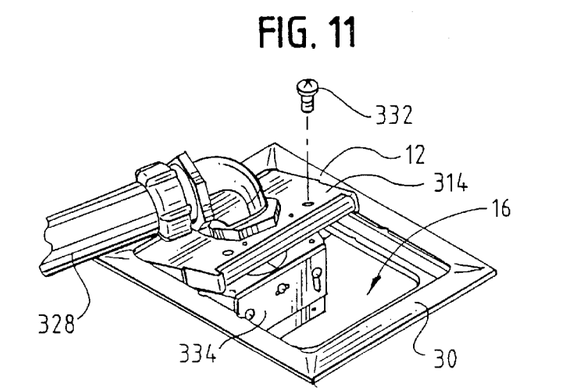
FIGS. 11–14 illustrate an embodiment of the cover assembly which is adapted for use with movable partition furniture.
Figure 12:
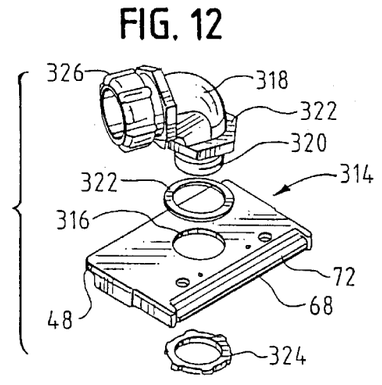
Figure 13:
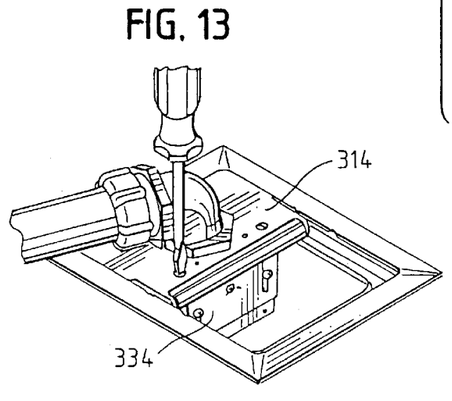

FIGS. 9 and 10 illustrate a flangeless bracket 112. The flangeless bracket 112 is identical to the bracket 12 of FIG. 1, except that it does not include the trim flange 30. In this respect, the bracket 112 consists entirely of the bracket central portion 28 which has the same general construction of the central portion of the bracket 12 shown in FIG. 1. As can be seen in FIGS. 9 and 10, the central portion 28 of the bracket is generally rectangular and is sized for insertion into the floor opening 21. The central portion 28 includes a pair of opposed side walls 102 and a pair of opposed end walls 104. Bottom walls 106 extend inwardly from the bottom edges of the side and end walls 102, 104. The bottom walls 106 engage against the bottoms of the access doors 14a, 14b to support them against downward movement relative to the bracket. A raised lip 108 formed along the inner edges of the bottom walls engages against the seal members 68 to seal against water infiltration therebetween.

Since there is no flange 30 in the flangeless bracket 112, support screws 116 are used to support the bracket 112 within the fitting 16. The support screws 116 thread into the apertures 36 in the corners of the fitting. The support screws 116 carry support brackets 118 at their upper ends which engage against the bottom of the flange 112 to support it vertically within the fitting 16. As will be appreciated, the height of the bracket 112 relative to the fitting 16 is controlled by how far the support screws 116 are threaded into the fitting. Hold down screws 120 extend through the bracket and thread into apertures 124 in the tops of the support screws 116 to secure the bracket 112 to the fitting 16.

Figure 14:
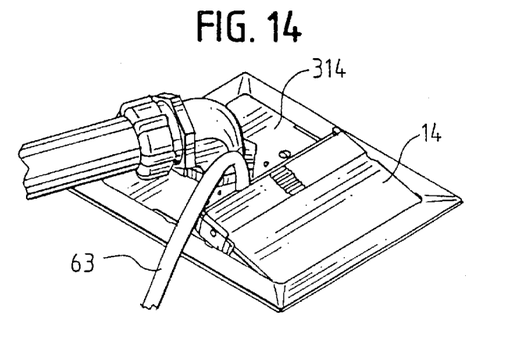

FIGS. 11–14 illustrate an embodiment of the cover assembly, which is adapted for use with movable partition furniture. This embodiment is similar to the embodiment of FIG. 1, except that one or both of the access doors is modified so it can be connected to a flexible partition feed conduit for routing wiring between the fitting and a piece of movable partition furniture (not shown). In this respect, the partition feed access door 314 includes a central opening 316 sized to receive a liquid tight fitting 318, such as an elbow fitting. One end of the fitting 318 includes a threaded portion 320, which is sized for insertion into the opening 316 in the access door 314. An annular gasket 322 is interposed between the access door 314 and a radial flange 322 on the fitting 318. The gasket is compressed between the flange 322 and the door 316 to seal around the opening 316. A nut 324 threads onto the fitting 318 from the bottom side of the door 316 to secure the fitting to the door. The other end of the fitting has a connector 326 adapted for interconnection with a wiring conduit 328. The conduit 328 extends between the fitting 318 and a piece of partition furniture (not shown) so that cables can be routed between the in-floor fitting 16 and the partition furniture. Once the conduit 328 is attached to the access door 314 and wired, the access door is connected to the flange 12 in the manner described above. The access door 316 can be secured to the in-floor fitting 16 by screws 332 that extend through the door 316 and thread into reciprocal threaded apertures in the fitting 16. In the illustrated embodiment, the threaded apertures are formed in a barrier 334 that is used to separate the power portion of the fitting from the data/communications portion of the fitting. Two of the partition feed doors 314 can be installed in the flange. Alternatively, (as is shown in FIG. 14), one of the partition feed doors 314 can be used in combination with an access door 14 of the type shown in FIG. 1.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A cover assembly for use with an in-floor fitting of the type having an interior compartment which is accessible through an opening in the surface of the floor, the cover assembly comprising:

a bracket connectable to the fitting and defining an access opening which aligns with the floor opening;

an access door connected to the bracket for movement between a closed position at which said access door overlies and closes at least a portion of the access opening and an open position at which at least a portion of the access opening is exposed to provide access to interior compartment, said access door defining at least a portion of a cable opening, the cable opening being sized to permit at least one cable to pass through said access door and into the fitting when said at least one door is at its closed position; and a seal member carried by said access door and being adapted to seal around cables passing through the cable opening when said at least one access door is moved to its closed position.

2. The cover assembly as set forth in claim 1, wherein the seal member comprises a compressible gasket.

3. The cover assembly as set forth in claim 1, wherein the seal member substantially seals the cable opening.

4. The cover assembly as set forth in claim 1, wherein said access door is pivotally connected to the bracket for movement between its open and closed positions.

5. The cover assembly as set forth in claim 1, further comprising an egress cover plate movably connected to said access door between a first position which overlies at least a portion of the cable opening and a second position at which at least a portion of the cable opening is exposed.

6. A cover assembly for use with an in-floor fitting of the type having an interior compartment which is accessible through an opening in the surface of the floor, the cover assembly comprising:

a bracket connectable to the fitting and defining an access opening which aligns with the floor opening;

first and second access doors connected to the bracket such that the doors can be opened to provide access to the inner compartment through the access opening and can be closed to cover access opening to prevent access to the inner compartment, the first and second doors being generally planar and defining a reduced size cable opening therebetween when the doors are at their closed position, the cable opening being sized to permit at least one cable to pass between the doors and into the interior compartment, at least one of the doors including a seal member which is adapted to seal around cables which pass through the cable opening.

7. A cover assembly as set forth in claim 6, wherein each of the doors includes a respective seal member adapted to seal around cables which pass through the cable opening.

8. A cover assembly as set forth in claim 7, wherein the seal members abut against one another to seal the cable opening when no cables are present in the opening.

9. A cover assembly as set forth in claim 7, wherein the seal members comprise compressible gaskets.

10. A cover assembly as set forth in claim 7, wherein the first and second doors each door include a respective egress cover, the egress covers being movably connected to the doors for selectively exposing and covering the cable opening.

11. A cover assembly for use with an in-floor fitting of the type having an interior compartment which is accessible through an opening in the surface of the floor, the cover assembly comprising:

a bracket connectable to the fitting and defining an access opening which aligns with the floor opening and is divided into first and second portions;

a first generally planar access door pivotally connected to the bracket for movement between a closed position at which it overlies the first portion of the access opening and an open position at which the first portion of the access opening is exposed;

a second generally planar access door pivotally connected to the bracket for movement between a closed position at which it overlies the second portion of the access opening and an open position at which the second portion of the access opening is exposed;

the first and second access doors defining a cable opening therebetween when the doors are at their closed position, the cable opening being sized to permit at least one cable to pass between the doors and into the interior compartment of the fitting; and the doors including cooperating seal members which are adapted to seal around cables passing through said cable opening when the doors are moved to their closed positions.

12. A cover assembly as set forth in claim 11, wherein the first and second doors each door include a respective egress cover, the egress covers being movably connected to the doors for selectively exposing and covering the cable opening.

13. A cover assembly as set forth in claim 11, wherein the seal members comprise compressible gaskets.

14. A cover assembly for use with an in-floor fitting of the type having an interior compartment which is accessible through an opening in the surface of the floor, the cover assembly comprising:

a bracket connectable to the fitting and defining a generally rectangular access opening which aligns with the floor opening and is divided into first half and a second half;

first and second access doors connected to the mounting bracket, each access door having a pivot end which is pivotally connected to the bracket and a free end which is movably about the pivot end between an open position at which a portion of the access opening is exposed to provide access to the interior compartment and a closed position at which the access door covers a portion of the access opening;

the free ends of the doors defining a cable opening therebetween when the doors are at their closed position, the cable opening being sized to permit at least one cable to pass between the doors and into the interior compartment; and each of the access doors including a compressible gasket carried by its free end, the compressible gaskets being positioned to abut with one another when the doors are moved to their closed position so as to seal the cable opening and seal around any cables passing therethrough.

* * * * *